(No Model.) 2 Sheets—Sheet 1.
F. O. BLACKWELL.
ELECTRIC MOTOR TRUCK.
No. 448,199. Patented Mar. 17, 1891.
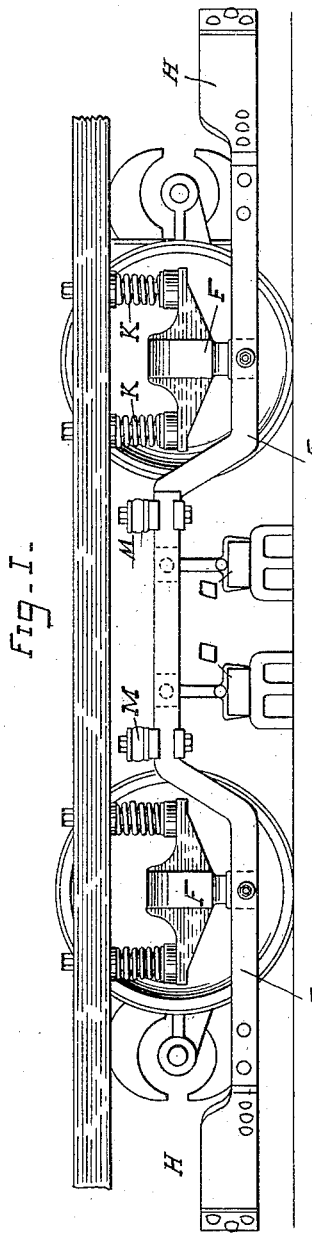
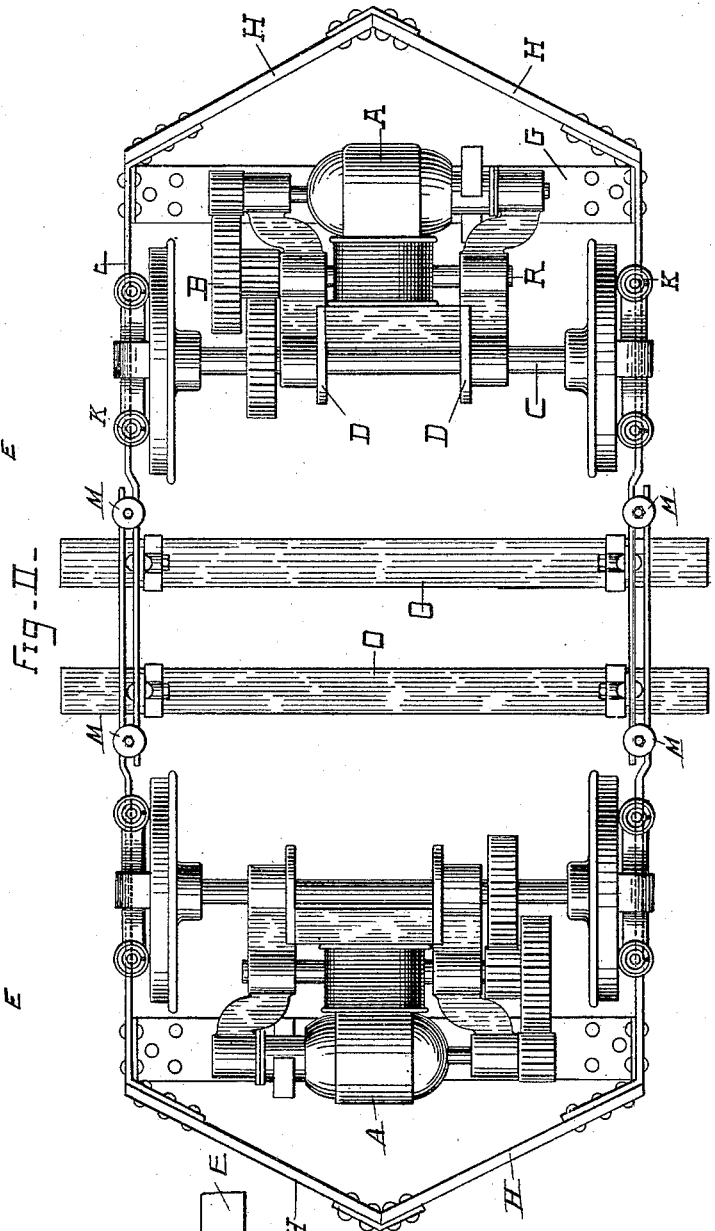
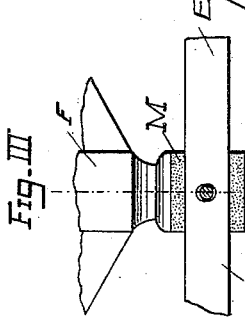
WITNESSES
J. L. Blackwell
R. J. Slater
INVENTOR
Francis O. Blackwell
by Bentley & Knight
Attys.

(No Model.) 2 Sheets—Sheet 2.

F. O. BLACKWELL.
ELECTRIC MOTOR TRUCK.

No. 448,199. Patented Mar. 17, 1891.

WITNESSES
Joseph E. Ane.
J. L. Blackwell

INVENTOR
Francis O. Blackwell
by Bentley Knight
Attys.

UNITED STATES PATENT OFFICE.

FRANCIS O. BLACKWELL, OF NEW YORK, N. Y., ASSIGNOR TO THE THOMSON-HOUSTON ELECTRIC COMPANY, OF CONNECTICUT.

ELECTRIC-MOTOR TRUCK.

SPECIFICATION forming part of Letters Patent No. 448,199, dated March 17, 1891.

Application filed June 17, 1889. Serial No. 314,600. (No model.)

*To all whom it may concern:*

Be it known that I, FRANCIS O. BLACKWELL, a citizen of the United States, residing at New York, in the county of New York, State of New York, have invented certain new and useful Improvements in Electric-Motor Trucks, of which the following is a specification.

My invention relates to electric-railway trucks especially adapted for street-car work, in which the truck is complete and independent of the car-body; and it consists in an arrangement of devices whereby the motor is rigidly connected to the axle of the car by bearings, so as to permit the accurate engagement of the gears, forming a driving-connection between the armature of the motor and the axle, while the outer extremity of the motor is supported upon a frame attached to the ordinary journal-boxes of the car outside the wheels and having a yielding connection which relieves the axle of the pounding action of the motor, while avoiding the necessity of additional bearings upon the axle.

My invention is illustrated in the accompanying drawings, in which—

Figure 4:
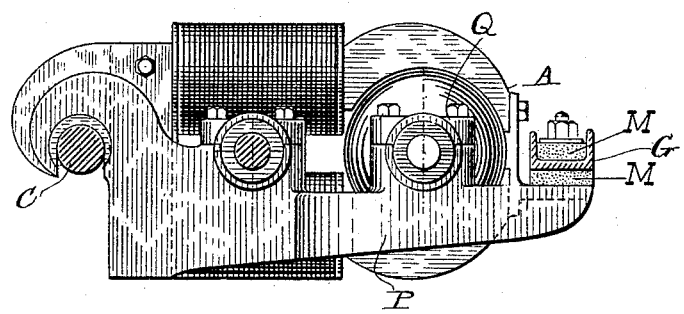
Figure 5:
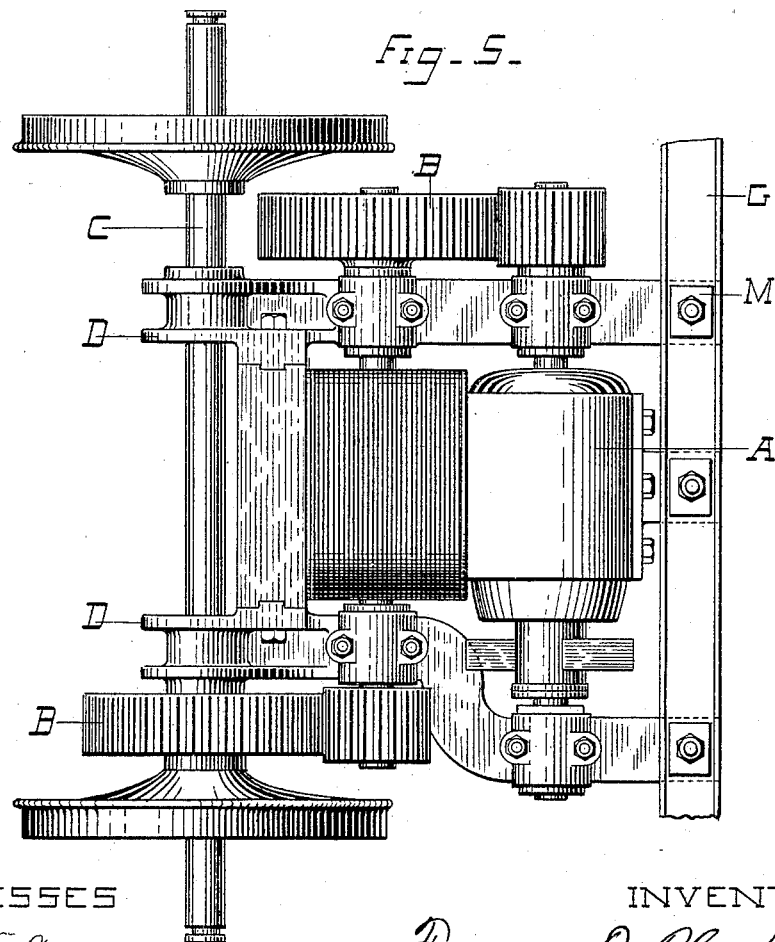

Figure 1 is a side elevation of the truck constructed according to my invention. Fig. 2 is a plan thereof with the axle-box removed. Fig. 3 is a detail, and Figs. 4 and 5 are respectively a side elevation and plan, of an improved motor-frame having an arrangement of gears especially adapted for the connection of electric motors with the axles of trucks or other vehicles.

Referring to the drawings, A represents an electric motor connected through gearing B with the axle C of a truck.

D D are rigid bearings extending from the frame-work of the motor and maintaining the alignment of the armature-shaft and countershaft with the axle, so that the gearing B may run accurately. The outer end of motor A is supported upon a frame-work consisting of side bars E E, attached to the journal-boxes F of the truck, placed in the ordinary manner outside of the wheels. The side bars E E are connected by a transverse bar or board G outside the axle, and also by diagonal pieces H H, forming a guard for the motor and for the prevention of accident. The outer end of motor A rests upon transverse piece G and the side bars E E are attached to the journal-boxes F at a point below the springs K, which support the car-body.

To diminish the pounding effect of the motor or motors upon the axles, the side bars are provided with a cushion which modifies the force of the jars and shocks to which the truck is exposed. This cushioning action may be secured, when the bars E extend directly from journal-box to journal-box, by providing them with a rubber or other spring, as at M, Fig. 3, at the point of attachment to the boxes, or, as shown in Figs. 1 and 2, where two motors are employed driving the respective axles, by dividing the truck-frame into two parts, as it were, each of which is attached directly to one of the axles, and by securing the bars together by bolts and rubber cushions, as seen at M, Figs. 1 and 2, which permits the desired amount of give.

In Fig. 2 the axle-boxes are not shown; but it will be understood that the side bars are connected to them, as in Fig. 1.

When it is necessary to employ plow-guides for connection with a line-conductor inclosed in a conduit, the bars F may be bent up, as shown in Fig. 1, and plow-guides O O passed underneath them so as to extend outside of the wheels.

In Figs. 4 and 5 it will be seen that the framing of the motor, by which it is connected to the axle, is so shaped that the intermediate shaft may have a gear-wheel at opposite ends instead of having all the gearing concentrated at one end, as shown in Fig. 2. By this means a more direct action of the armature upon the axle is insured, the pressure being more uniformly balanced and the connection between the bearings of each of the engaging wheels is more direct. The arrangement also allows of more lateral room, so that a sprocket-wheel or other connecting device between the two axles may be employed. It will be observed that in this arrangement the pinions upon the armature-shaft and the intermediate shaft are all the same size, and the same is true of the gear-wheels upon the intermediate shaft and the axle.

While heretofore the pinions upon the armature-shaft have been much smaller than those on the intermediate shaft, since it rotates at a much greater speed, I have enlarged the pinion of the armature-shaft to a point greater than is normally required, in order that it may be a duplicate of the intermediate pinion, thereby insuring much convenience and economy in operation. It will be seen from the side elevation that the arm P of the side frame extends outward from the axle at a much lower elevation than in the constructions heretofore employed, and that the bearing Q for the armature-shaft is elevated above the side arm. As in this case the motor is accessible from outside the vehicle, the depression of the side arm and the elevation of the bearing affords great convenience in reaching the commutator, the commutator end of the armature running in that bearing and there being no gears adjacent to the bearing. It will be seen that the pole-pieces of the motor and the extending arms of the frame carrying the armature-shaft and counter-shaft are all three connected to a common support R, as shown in Figs. 4 and 5, which is a portion of the truck-frame. By this means the possibility of breaking the side arms or bending them so as to destroy the alignment of the armature within the pole-pieces is rendered impossible.

Cushions may be placed as shown at M in Fig. 4.

What I claim as new, and desire to secure by Letters Patent, is—

1. The combination, with an electric motor having a framing journaled upon the axle of a vehicle and carrying gears connecting the armature-shaft with the axle, of a framing independent of the car-body attached to the journal-boxes of the truck outside of the wheels, supporting the free end of the motor and provided with a cushion modifying its action upon the journal-boxes.

2. The combination, with journal-boxes F, having springs supporting the car-body, of side bar E, forming part of a motor-supporting frame, and an intermediate cushion M, substantially as described.

3. The combination, in an electric-motor truck, of a motor extending outside of the axle and geared thereto and a framing supporting the outer end of said motor, attached to the journal-boxes outside of the wheels, with an outside cross-bar supporting the free end of the motor.

4. The combination, with an electric motor, of a framing therefor provided with bearings upon the axle, an armature-shaft and a counter-shaft carried by the said framing, the latter having gears at opposite ends thereof, and an independent frame supporting the free end of the motor.

5. The combination, with an electric motor, of a driving-axle and an intermediate gearing with a framing connecting the bearings of the motor with the axle, the said framing having an extension provided with a bearing for the commutator end of the armature-shaft, whereby the commutator is free of the said framing.

6. The combination, in an electric-railway motor, of the side arms extending from the yoke and carrying the gear connections between the armature-shaft and counter-shaft, and a common support for the said arms and the pole-piece.

7. The combination, in a motor-truck, of an electric motor and a framing journaled at one end upon the axle and furnishing bearings for the armature and counter-shaft, with the counter-shaft midway between the armature and axle, duplicate pinions upon the armature and counter-shaft, and duplicate gear-wheels upon the counter-shaft and axle.

FRANCIS O. BLACKWELL.

Witnesses:
R. W. BLACKWELL,
FREDK. H. HOWELL.